United States Patent
Henry et al.

(10) Patent No.: US 10,462,015 B1
(45) Date of Patent: Oct. 29, 2019

(54) DETECTING PHYSICAL TOPOLOGY CHANGES AFFECTING CELLS AND CELL EDGE DETERMINATION

(71) Applicant: Cisco Technology, Inc., San Jose, CA (US)

(72) Inventors: Jerome Henry, Pittsboro, NC (US); Vishal S. Desai, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 16/052,493

(22) Filed: Aug. 1, 2018

(51) Int. Cl.
*H04L 12/24* (2006.01)
*H04W 24/10* (2009.01)
*H04W 64/00* (2009.01)
*H04L 12/26* (2006.01)
*H04W 16/18* (2009.01)

(52) U.S. Cl.
CPC .............. *H04L 41/12* (2013.01); *H04L 43/12* (2013.01); *H04L 43/50* (2013.01); *H04W 16/18* (2013.01); *H04W 24/10* (2013.01); *H04W 64/003* (2013.01)

(58) Field of Classification Search
CPC . H04J 3/14; H04L 43/50; H04L 45/00; H04L 43/00; H04L 45/26; H04L 43/0852; H04L 43/08; H04L 2012/5608; H04B 17/003; H04W 24/00; H04W 36/30; H04W 36/24; H04W 84/12; H04W 88/08; H04W 80/04; H04W 88/06; H04W 84/18; H04W 74/08; H04W 8/26

USPC .... 370/248, 252, 332, 310.2, 328, 338, 349, 370/241
See application file for complete search history.

(56) References Cited

U.S. PATENT DOCUMENTS

| | | | |
|---|---|---|---|
| 7,542,762 B2 | 6/2009 | Uchida et al. | |
| 7,738,413 B2 | 6/2010 | Varaiya et al. | |
| 10,091,674 B2* | 10/2018 | Kim | H04W 24/06 |
| 2005/0122231 A1 | 6/2005 | Varaiya et al. | |
| 2010/0246416 A1* | 9/2010 | Sinha | H04W 24/06 370/250 |
| 2011/0103235 A1* | 5/2011 | Luong | H04L 43/024 370/245 |
| 2013/0021912 A1* | 1/2013 | Finlow-Bates | G01S 5/021 370/241 |

* cited by examiner

*Primary Examiner* — Brenda H Pham
(74) *Attorney, Agent, or Firm* — Patterson + Sheridan, LLP (57) ABSTRACT

The embodiments herein uses sensor APs (e.g., APs that do not associate with client devices) to detect changes in physical topology that affect cell coverage areas and determine cell edges for different client devices. In one embodiment, using test signals (e.g., test probes) transmitted by the sensor APs which are received at normal APs which do associate with client devices, a controller can generate baselines which characterize the signals received from the sensor APs at the normal APs. At intervals or in response to an unexpected action by a client device, one or more of the sensor APs can transmit another test signal. Because the test signal can be received at multiple normal APs, the controller can compare the test signal to the baselines to identify whether there has been a change in physical topology that affects the cell coverage area for the client device.

20 Claims, 6 Drawing Sheets

DETECTING PHYSICAL TOPOLOGY CHANGES AFFECTING CELLS AND CELL EDGE DETERMINATION

TECHNICAL FIELD

Embodiments presented in this disclosure generally relate to detecting changes in physical topology that affect cell coverage areas and determining cell edges.

BACKGROUND

Most Wi-Fi infrastructure vendors advertise cell design recommendations for configuring access points (APs) at a site. For example, the vendor may recommend placing the cell edge at −67 dBm, which is a way to describe that, at a location where a signal transmitted by a first AP as measured by a site survey device reaches −67 dBm, the survey device should also measure a signal transmitted by a second AP at about that same value. Any movement of the site survey device towards either the first or second AP would increase the received signal strength, thereby providing a strong signal when a client device decides to roam.

However, the signal measurements captured by the site survey device is only valid at a given point in time and space. Once the cell is deployed, client devices (also referred to herein as simply "clients") with different receive and transmit thresholds may not read the same signal value from the APs at the same physical point. Additionally, the transmission power of the APs may change dynamically as part of a radio resource management scheme. Further, radio frequency (RF) conditions change at the micro level (e.g., at the clients), but can also change at macro level (e.g. the movement of people or physical objects change). As a result, the cell boundaries designed at survey time when initially configuring the APs may not offer the optimal cell edge during the lifetime of the network, and may not offer the same edge position for different types of clients. This is a major issue for administrators, who typically have no visibility into the experience of different types of clients, as well as changes made to the physical layouts of the site.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DESCRIPTION OF EXAMPLE EMBODIMENTS

Overview

One embodiment presented in this disclosure is a system that includes a plurality of access points (APs) disposed at a site, the plurality of APs configured to associate to client devices, a sensor AP configured to transmit first test signals to the plurality of APs, and a controller. The controller is configured to determine, at a first time period, baselines for the sensor AP at a first AP of the plurality of APs and at a second AP of the plurality that received the first test signals and instruct the sensor AP to transmit second test signals to the plurality of APs at a second time period after the first time period where the second test signals are received at the first and second APs. Upon determining that a characteristic of the second test signals is substantially the same as the baseline corresponding to the first AP but is substantially different from the baseline corresponding to the second AP, the controller is configured to determine a change in physical topology that affects a radio frequency (RF) environment at the site.

Another embodiment described herein is a method that includes instructing a sensor AP to transmit first test signals to a plurality of APs deployed at a site, determining, at a first time period, baselines for the sensor AP at a first AP of a plurality of APs and at a second AP of the plurality that received the first test signals, and instructing the sensor AP to transmit second test signals to the plurality of APs at a second time period after the first time period where the second test signals are received at the first and second APs. Upon determining that a characteristic of the second test signals is substantially the same as the baseline corresponding to the first AP but is substantially different from the baseline corresponding to the second AP, the method includes detecting a change in physical topology that affects an RF environment at the site.

Another embodiment described herein is a non-transitory computer-readable medium for monitoring an RF environment at a site. The non-transitory computer-readable medium having program instructions embodied therewith, the program instructions executable by a processor to perform an operation. The operation includes instructing a sensor AP to transmit first test signals to a plurality of APs deployed at the site, determining, at a first time period, baselines for the sensor AP at a first AP of the plurality of APs and at a second AP of the plurality that received the first test signals, and instructing the sensor AP to transmit second test signals to the plurality of APs at a second time period after the first time period where the second test signals are received at the first and second APs. Upon determining that a characteristic of the second test signals is substantially the same as the baseline corresponding to the first AP but is substantially different from the baseline corresponding to the second AP, the operation includes detecting a change in physical topology that affects an RF environment at the site.

EXAMPLE EMBODIMENTS

The embodiments herein use sensor APs (e.g., APs that do not associate with client devices) to detect changes in physical topology that affect cell coverage areas and to determine cell edges for different types of client devices. Disposing sensor APs in the same area used by client devices can provide specific advantages over other cell detection techniques such as Neighbor Discovery Protocol (NDP) which test an AP to AP link. For example, NDP messages are transmitted using the same power level, and thus, may not accurately account for individual client receive/transmit sensitivity near the floor of the site, or RF pattern change that may occur outside of the NDP test period. Further, NDP message are sent at the lowest possible data rates which provides a different view of a cell edge than that of a client device using higher data rates.

The sensor APs can be disposed at various locations in the site that are the same, or proximate too, the locations of the client devices. Typically, the APs (e.g., the "normal" APs to which the client devices associate) are disposed on the ceiling or roof of the site while the client devices are near the floor of the site (e.g., a laptop sitting on a desk or a mobile phone carried by a user). In contrast to the normal APs, the sensor APs may be plugged into wall outlets near the floor, and thus, have a similar signal transmission relationship to the normal APs as the client devices. That is, the same physical objects in the site that affect the ability of the client devices to communicate with the normal APs may also affect the ability of the sensor APs to communicate with the normal APs.

In one embodiment, using test signals (e.g., test probes) transmitted by the sensor APs that are received at the normal APs, a controller can generate baselines which characterize the signals received at the normal APs. If a client device performs an unexpected action such as sending a probe request early or reducing its data rates, the controller can select one of the sensor APs to transmit a test signal similar to the signal transmitted by the client device. Because the test signal can be received at multiple normal APs, the controller can compare the test signal to the baselines to identify whether there has been a change in physical topology that affects the cell coverage area for the client device. For example, if a new object has been introduced or an old object has been removed, the resulting attenuation and reflections caused by the change in physical topology may change the cell boundaries. Using the known baselines of the sensor APs, the controller can detect these changes in physical topology and perform a corrective action such as alerting a system administrator or changing the transmission power of the APs.

In another embodiment, the test signals transmitted by the sensor APs can be used to identify the cell edge. When a client device sends out a probe when roaming between the normal APs, a selected sensor AP also sends out a test probe. If the characteristics of the test probe are similar to the previously recorded baselines, the controller can determine that the network topology has not changed substantially. In response, the controller can use the characteristics of the client device probe when received at the sensor AP to determine a distance from the client device to the sensor AP. The controller can determine a geographic location of the of the client device in the site. Each time the same type of client device roams between the two APs, the controller can repeat this method to identify locations that each correspond to a point along the cell edge. From these points, the controller can extrapolate the cell edge and then identify coverage holes as well as locations where cells may have too much overlap.

Figure 1:
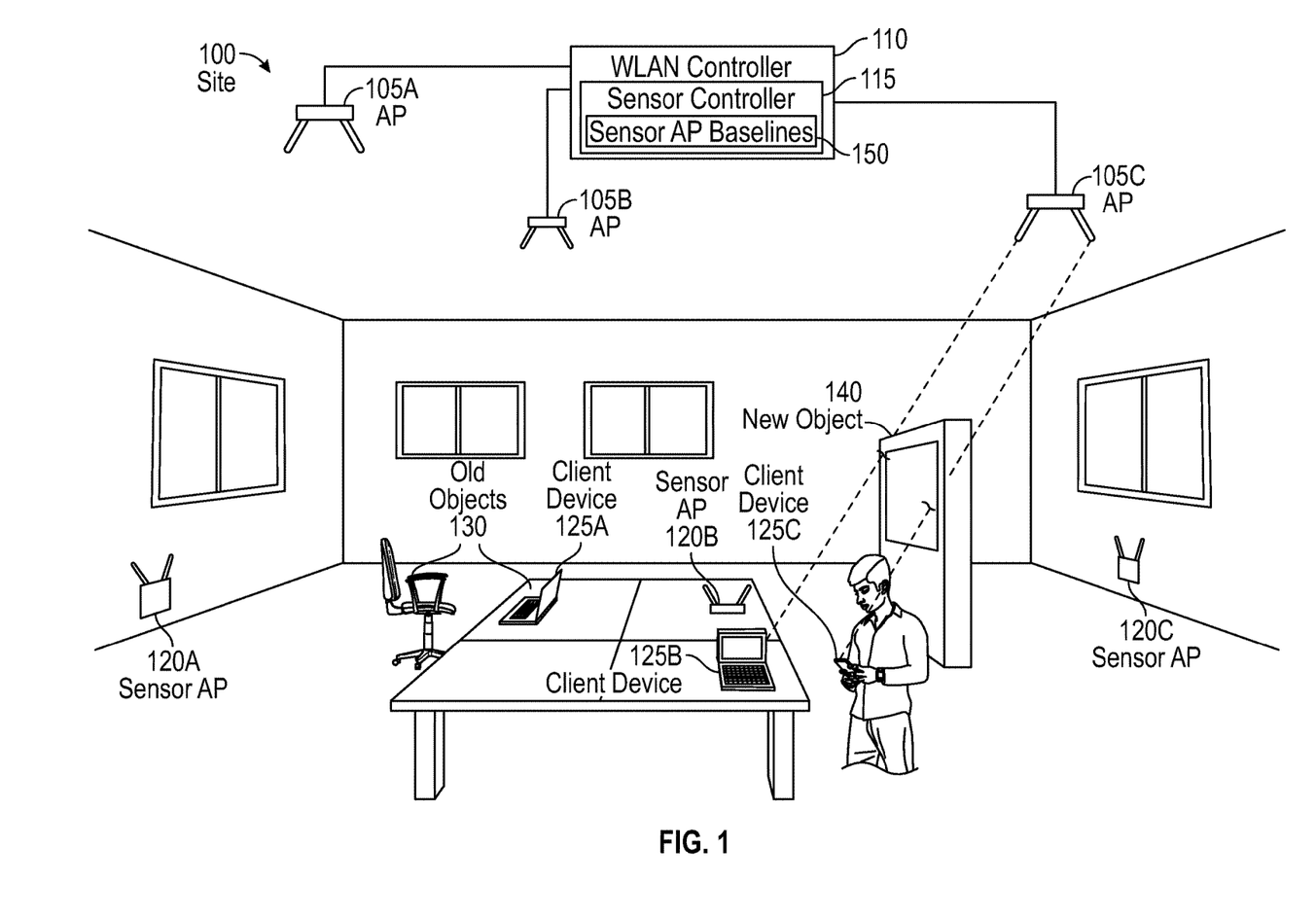
FIG. 1 is a site that includes multiple APs and sensor APs for detecting changes to physical topology affecting cell coverage areas, according to one embodiment described herein.

FIG. 1 is a site 100 that includes multiple APs 105 and sensor APs 120 for detecting changes to physical topology affecting cell coverage areas, according to one embodiment described herein. The APs 105 are also referred to as normal APs which host client devices 125. That is, the client devices 125 can associate with the APs 105 which provide the client devices 125 with access to a network (e.g., a LAN or WAN). The sensor APs 120, in contrast, are used for sensing/testing purposes and do not provide connectivity for client devices. That is, in one embodiment, the client devices 125 cannot associate with the sensor APs 120. Further, the APs 105 are coupled to a wireless LAN (WLAN) controller 110 which permits the client devices 125 associated with the APs 105 to access a network.

The WLAN controller 110 includes a sensor controller 115 which can communicate either wirelessly or using wired connections to the sensor APs 120. The sensor controller 115 can configure the sensor APs 120 to perform the sensing/testing functions described herein. Moreover, the sensor controller 115 can provide instructions to the sensor APs 120 in real time to perform a specific task as well as receive sensor data measured by the sensor APs 120. The sensor controller 115 may be a software application, firmware, hardware, or combinations thereof in the WLAN controller 110. Further, although shown as being separate from the APs 105 (e.g., a separate computing device), the WLAN controller 110 may be a software application executed by one of the APs 105. Alternatively, the WLAN controller 110 and the sensor controller 115 may be cloud based applications which are hosted at a data center remote from the site 100. In that case, the sensor controller 115 may use one or more of the APs 105 to communicate with the sensor APs 120.

In FIG. 1, the APs 105 are disposed on a ceiling of the site 100, but often are disposed high up on the walls. Doing so permits the APs 105 to transmit down onto the floor of the site 100 which may minimize interference from the objects within the site 100. However, as discussed above, using AP-to-AP communication between the APs 105 (such as with NDP) to evaluate the cell coverage areas is limited since the client devices 125 are disposed nearer to the floor of the site 100, and thus, are more affected by interference cause by the physical objects in the site 100. To provide test signals that better represent the experience of the client devices 125, the sensor APs 120 can be disposed in or near the same area of the site 100 as the client devices 125 (e.g., closer to the floor). For example, the sensor APs 120A and 120C are plugged into wall outlets near the floor while the sensor AP 120B is disposed on a desk shared by the client devices 125A and 125B (e.g., laptops or tablet computers). Thus, the communication signals transferred between the sensor APs 120 and the APs 105 may more accurately mirror or represent the communication between the client devices 125 and the APs 105.

In one embodiment, the sensor APs 120 may be a scaled down version of the APs 105. For example, the form factors of the sensor APs 120 may be smaller and have less hardware or more cost efficient components. That is, because the sensor APs 120 do not host client devices 125, they can be both smaller and less expensive than the APs 105. Further, when installing the sensor APs 120, the system administrator may record the distances between sensor APs 120 and the APs 105. Moreover, the characteristics of the signals transmitted by the sensor APs 120 and the radiation patterns are known and can be sent to the sensor controller 115. Thus, unlike the client devices 125, the sensor controller 115 can have a record of both the respective distances between the sensor APs 120 and the APs 105, as well as the characteristics (e.g., data rate, transmission power levels, and radiation pattern) of the signals transmitted by the sensor APs 120.

In FIG. 1, it is assumed that when the cell coverages areas of the APs 105 where configured, the site 100 include the old objects 130 but did not include the new object 140. Put differently, when first installing the APs 105, a system administrator may have moved a site survey device around the floor of the site 100 to adjust the coverage area of the cell formed by each of the APs 105. Using measurements captured by the site survey device, the system administrator can adjust the data rates and/or the transmission power of the APs 105 to define the cells edges to eliminate coverage holes in the site 100 and ensure there is not too much overlap between the cells—e.g., less than 20% overlap between neighboring cells. However, later, the new object 140 may have been installed in the site 100. The new object 140 may be a teleconference platform which may cause interference such as attenuating signals transmitted by the APs 105 and the client devices 125 or causing reflections which affect a cell coverage area of at least one of the APs 105. Put differently, the new object 140 changes the cell edge for at least one of the APs 105. For example, because the new object 140 is between the client devices 125B and 125C and the AP 105C as shown by the dotted lines, the new object 140 affects the ability of the client devices 125B and 125C to communicate with the AP 105C, and vice versa (e.g., attenuates or reflects the signals). Before the new object 140 was moved to the site, the cell edge may have extended to cover the current locations of the client device 125B and 125C. However, now, the object 140 has changed the cell edge of the AP 105C with respect to the client devices 125B and 125C. For example, the client devices 125C may decide to roam to a different AP 105 at its current location when before the object 140 was added, the signal strength of the AP 105C was sufficient to prevent roaming.

As described below, the sensor APs 120 are used to detect when the new object 140 has caused the cell edge (or coverage area) for a particular client device to change. Although FIG. 1 illustrates adding the new object 140 to the site, other changes to the physical topology can affect the cell coverage areas of the APs 105 such as moving the objects already in the site 100, adding holes in walls or windows, adding a RF reflective material to a surface, and the like.

Figure 2:
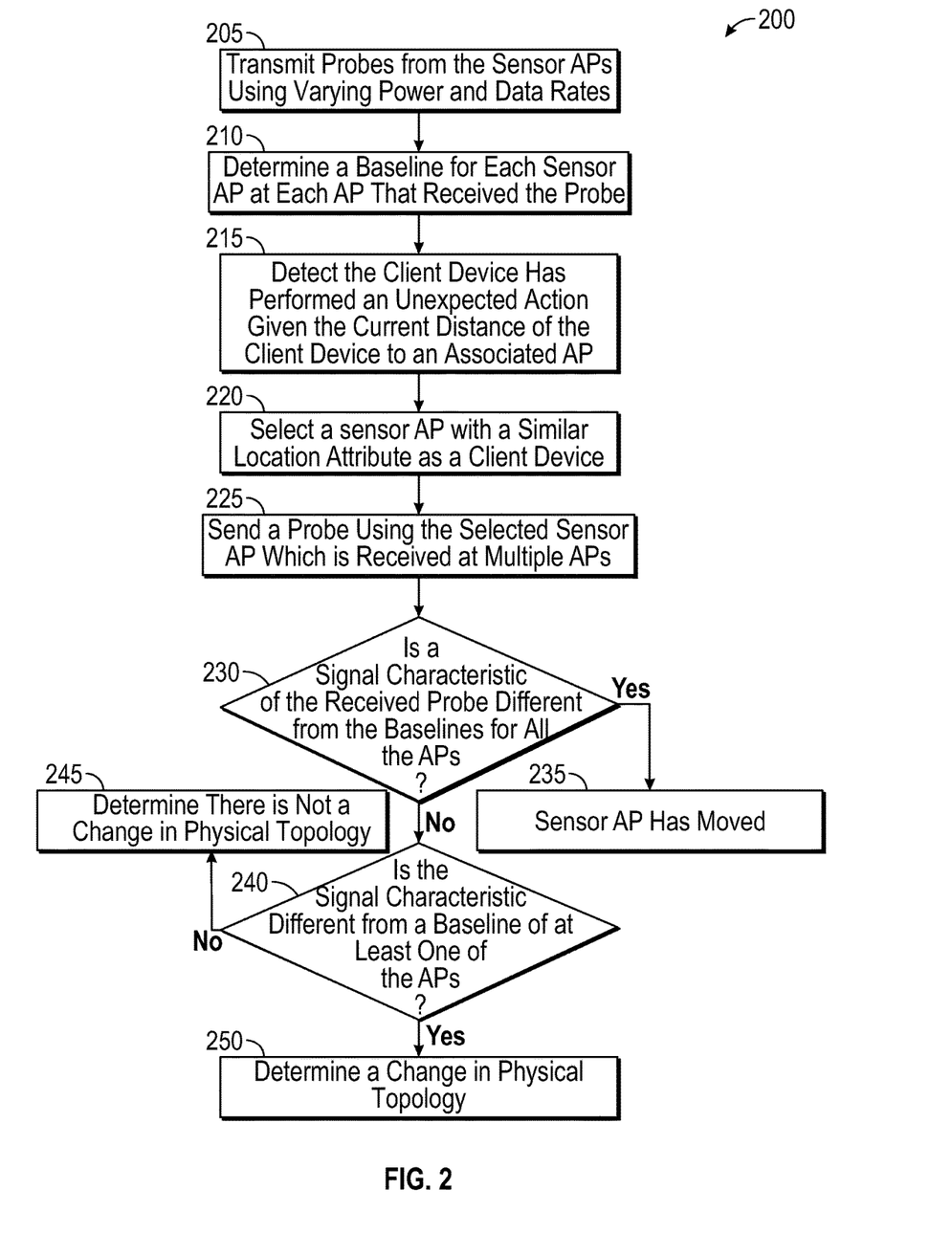
FIG. 2 is a flowchart for detecting changes to physical topology affecting cell coverage areas, according to one embodiment described herein.

FIG. 2 is a flowchart of a method 200 for detecting changes to physical topology affecting cell coverage areas, according to one embodiment described herein. For clarity, the blocks of method 200 are discussed using the site 100 illustrated in FIG. 1, but the method 200 can be used in any AP deployment with any number of APs 105 and sensor APs 120.

At block 205, the sensor APs 120 transmit probe requests to the APs 105 using varying power and data rates. That is, unlike NDP messages which are typically transmitted with only one power level and one data rate, the sensor APs 120 transmit multiple test signals with varying power levels and data rates to better simulate client devices 125 which can adjust both their power levels and data rates. The probe requests transmitted by one of the sensor APs 120 may be received at multiple APs 105. For example, the probe requests transmitted by the sensor AP 120A may be received at both APs 105A and 105B, while the probe requests transmitted by the sensor AP 120B may be received by the APs 105A, 105B, and 105C.

At block 210, the sensor controller 115 determines a baseline for each sensor AP 120 at each AP 105 that received the probes. For example, if the APs 105A and 105B both received the probe request from the sensor AP 120A, then the sensor controller 115 can use the characteristics of the received probe request to generate a first baseline of sensor AP 120A for the AP 105A and a second baseline of the sensor AP 120A for the AP 105B. In stable network conditions, the probes may be received at the APs 105 at a stochastic value around an average received signal strength indication (RSSI). That is, fading and micro conditions are expected to change the RSSI values only slightly from one measurement to the next.

In one embodiment, the baselines may be generated in a controlled environment. For example, the system administrator may indicate when the baselines for the sensor APs 120 should be captured which may be when all the furniture has been placed in the site 100 or when people are not present or moving around in the site 100. Once captured, the baselines (e.g., the sensor AP baselines 150) can be stored in the sensor controller 115.

At block 215, the WLAN controller 110 detects that a client device 125 has performed an unexpected action given the current distance of the client device to an associated AP 105. For example, assume that client device 125C is currently associated with the AP 105C. The signals received at the AP 105C from the client device 125C may have attenuated by −30 dBm but the client device 125C has transmitted a probe request indicating it is preparing to roam to a different AP 105. That is, due to differences in the transmit and receive channels caused by the new object 140, the AP 105C receives signals with a −30 dBm attenuation from the client device 125C but the client device 125C receives signals from the AP 105C at a −70 dBm attenuation which causes it to send the probe request and attempt to roam to a different AP. Based on the −30 dBm attenuation, the AP 105C may estimate an RF distance to the client device 125C which should be well within cell coverage area of the AP 105C. As such, to the perspective of the AP 105C, the client device 125C should not be sending out a probe request unless there has been a temporary or permanent change in the physical topology of the site 100.

In another example, the AP 105C receives signals with a −30 dBm attenuation (which correlates to an estimated RF distance between the AP 105C and the client device 125C) that indicates the client device 125 should be transmitting at a first data rate, but due to the interference caused by adding the new object 140, the client device instead transmits data at a significantly lower data rate. This scenario can also indicate a temporary or permanent change in the physical topology of the site 100 which may have changed the coverage area of the cell for the AP 105C.

It should be noted that the cell coverage areas may be different from different client devices 125. For example, laptops or tablets may roam or change data rates based on different values (e.g., different attenuations of RSSI or signal to noise ratios (SNR)) than mobile phones. Similarly, different manufacturers of the same type of devices (e.g., different mobile phone manufacturers) may use different values when determining to roam or change data rates. As such, the cell coverage areas (and the cell edges) may be different for different types of client devices as well as different manufacturers of the same type of client devices.

At block 220, the sensor controller 115 selects a sensor AP 120 with a similar location attribute as the client device 125. The selected sensor AP 120 does not have to be the sensor AP 120 closest to the client device 125, although that could be the criteria used by the sensor controller 115. In another example, the sensor controller 115 selects the sensor AP 120 that is in the most similar direction as the client device 125 that performed the unexpected action. For example, referring to FIG. 1, assuming the client device 125C performed the unexpected action, the sensor AP 120C may be the closest sensor AP 120 to the client device 125C but the sensor controller 115 may select the sensor AP 120B if its straight line path to the AP 105C is most similar to the direction traveled by the straight line path from the client device 125C to the AP 105C. By selecting a sensor AP 120 closest to the client device 125 or that has a straight line path in the same or similar direction as the client device 125 to the AP 105, it is more likely the signals transmitted by the selected sensor AP 120 are affected by the same objects as the signals transmitted by the client device 125.

At block 225, the sensor controller 115 instructs the selected sensor AP 120 to transmit a probe request which can be received at multiple APs 105. Again, because the selected sensor AP 120 has a similar location attribute as the client device 125, it may be the sensor AP 120 that best represents the experience of the client device 125.

At block 230, the sensor controller 115 determines whether a signal characteristic of the received probe is different from the baselines for all the APs 105 that received the probe transmitted by the selected sensor AP 120. For example, the sensor controller 115 may determine whether the RSSI or SNR of the received probe is substantially different (e.g., more than 5% difference) from the baselines 150 captured previously. Because the sensor AP 120 is controlled by the sensor controller 115, the controller 115 knows the power and data rate used by the sensor AP 120, and thus, can compare this received signal to a comparable signal sent when generating the baselines. Put differently, the sensor controller can compare the RSSI and/or SNR of the received probe at the APs 105 to the RSSI and/or SNR stored in the baseline 150 when the selected sensor AP used the same power level and data rate. In this manner, the sensor AP 120 serves as a reference for identifying when there is a change in the physical topology between when the baselines were captured and when the client device performed an unexpected action.

If the characteristics of the received probe at all the APs 105 is different from the baselines, the method 200 proceeds to block 235 where the sensor controller 115 determines that the selected sensor AP 120 has moved. That is, sometime after capturing the baselines, someone (either on purpose or accidentally) moved the sensor AP to a different location. In one embodiment, the sensor controller 115 sends a message to the system administrator indicating that the sensor AP 120 was likely moved. A computation routine can help evaluate the general direction of the displacement based on which AP signal increased/decreased, which new AP 105 is reading the signal, etc. to then identify a new location of the sensor AP 120.

However, if characteristic of the probe is not different from all the baselines of the APs 105 that received the probe, the method 200 proceeds to block 240 to determine whether the signal characteristics of the received probe is different from a baseline of at least one of the APs. That is, the sensor controller 115 determines whether the received probe has substantially the same signal characteristics (e.g., within 5%) as the baseline for one AP 105 but not for another AP 105. For example, when the sensor AP 120B sends out the probe, it may be received at all three APs 105. The RSSI or SNR of the received probe at the APs 105A and 105B may substantially match the baselines 150 but the RSSI or SNR of the received probe at the AP 105C does not match the corresponding baseline 150. If so, the method 200 proceeds to block 250 where the sensor controller 115 determines there is a change in physical topology at the site 100. More specifically, because the received probe matched the baselines 150 for the APs 105A and 105B but not the baseline 150 for the AP 105C, the sensor controller 115 can estimate the change occurred between the sensor AP 120B and the AP 105C, although this is just an estimate since interference from, for example, RF reflections are difficult to predict. If desired, the sensor controller 115 can select another sensor AP 120 and AP 105 pair that has a straight line path that extends through the straight line path between the selected sensor AP (e.g., sensor AP 120B) and the AP the client device is currently associated with (e.g., AP 105C). For example, the sensor controller 115 can instruct the sensor AP 120C to transmit a probe which is hopefully received at AP 105B. If the signal characteristics of that probe request are different from a previously stored baseline, the sensor controller 115 has more confidence the change in the physical topology occurred in the region between the sensor AP 120B and the AP 105C and between the sensor AP 120C and the AP 105B.

In one embodiment, the sensor controller 115 instructs the selected sensor AP 120 to transmit the probe multiple times over an extended time frame. The unexpected action by the client device 125 and the change in the signal characteristic of received probe detected at blocks 215 and 240 may result from a temporary change in the physical topology of the site 100. For example, maintenance personal may currently be moving a large, RF reflective object through the site 100 which affects the cell coverage area. By repeating blocks 225 and 240 over minutes, days, or even weeks, the sensor controller 115 can first determine whether the change in the physical topology is permanent before performing a corrective action or alerting the system administrator.

In one embodiment, the sensor controller 115 performs a corrective action such as changing the transmission power of the affected AP 105 or the data rates it uses. For example, because of the new object 140, the sensor controller 115 may instruct the AP 105C to increase its transmission power to increase its coverage area or transmit higher data rates at a higher attenuation threshold. Also, the method 200 can detect that a cell coverage area has increased (e.g., if the object 140 was removed) if client devices or sensor APs 120 begin communicating with the AP 105C with greater RSSI or SNR levels than in the baselines 150. In that example, the sensor controller 115 may reduce the transmission power level and/or change the data rates for the AP 105C. This action may be taken automatically by the sensor controller 115 (without input from the system administrator) or may be sent as suggestions to the system administrator.

However, if the signal characteristics of the received probe substantially matches the baselines for all of the AP 105 that received the probe, the method 200 proceeds to block 245 where the sensor controller 115 determines there was not a change in the physical topology. In this case, the unexpected action detected at block 215 may have been caused by a micro condition at the client device (e.g., by the way the user was holding the client device), and thus, no action should be taken by the sensor controller 115.

Although FIG. 2 illustrates performing blocks 225-250 in response to detecting an unexpected action at a client device, this is not a requirement. In another embodiment, the sensor controller 115 may repeat blocks 225-250 at a predefined rate by sending test probes from all the sensor APs 120 and comparing the signal characteristics of the probes received at the APs 105 to the baselines 150. In this manner, the sensor controller 115 can determine when a sensor AP 120 moves (block 230 and 235), or whether there is a change in the physical topology (blocks 240 and 245) without waiting for a client device to perform an unexpected action.

Figure 3:
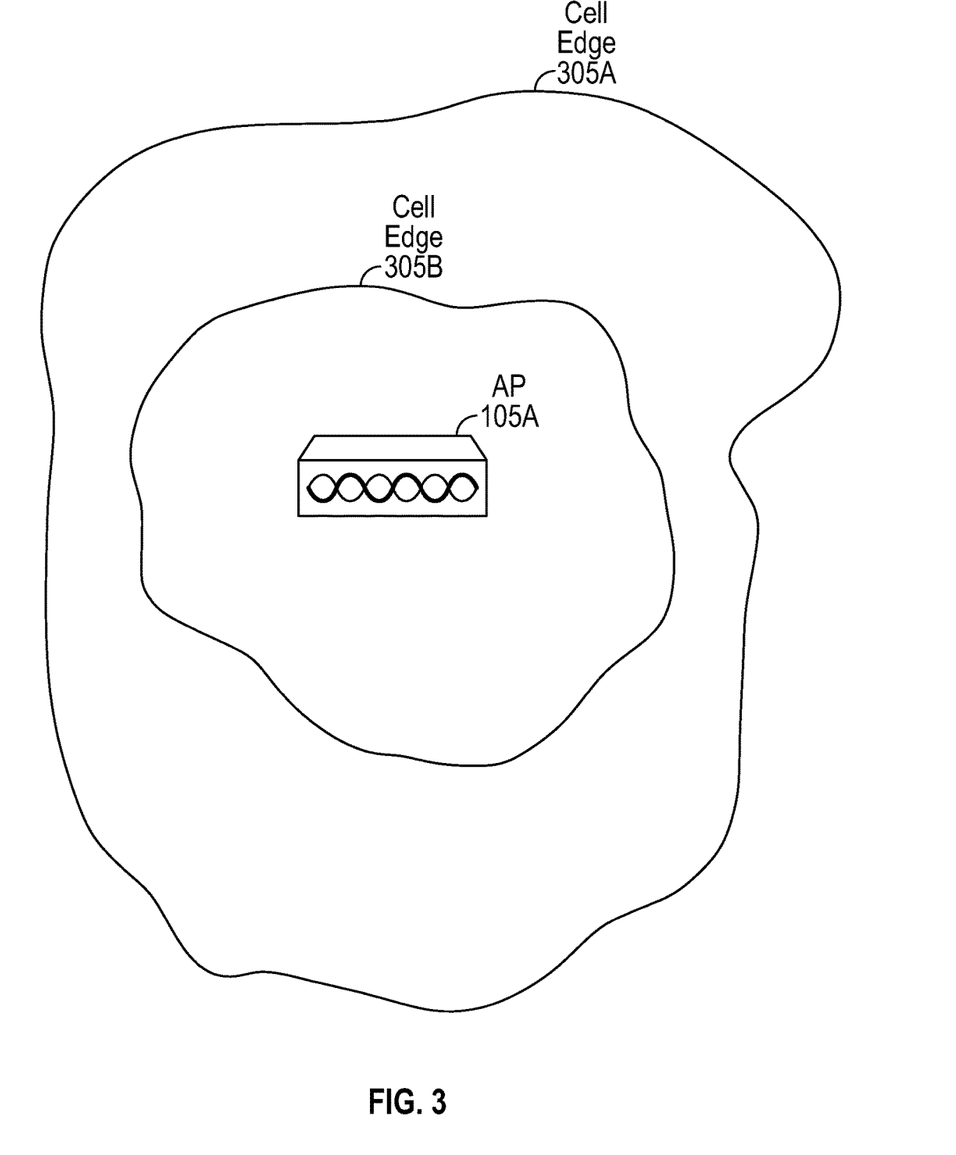
FIG. 3 illustrates different cell edges for a particular client device at different transmission power levels of the AP, according to one embodiment described herein.

FIG. 3 illustrates different cell edges 305 for a particular client device for different transmission power levels of the AP 105A, according to one embodiment described herein. The cell edges 305 indicate a boundary that encloses the cell coverage area for the AP 105A. As a client device associated with the AP 105A within the cell coverage area reaches the cell edge 305, the client device transmits a probe request as part of preparing to roam to another neighboring cell (if available).

As mentioned above, the cell edges 305 for the AP 105A can vary depending on the type of client device and the manufacture of the client device. For example, a first mobile device may roam when the RSSI of the signals received from the AP 105A reach an attenuation of −70 dBm but a second mobile device may roam when the SNR of the signals received from the AP 105A reaches an attenuation of −24 dBm. As such, the cell edges 305, and thus, the cell coverage areas for the two client devices may be different.

FIG. 3 illustrates two different cell edges 305 for the same client device but with the AP 105A using different transmission power levels. For example, the cell edge 305A corresponds to a greater transmission power level used by the AP 105A and defines a larger cell coverage area than the cell edge 305B. To adjust the cell coverage areas, it may be helpful to first identify the cell edge 305 for different client devices—e.g., the cell edges for laptops, tablets, mobile phones, and their various manufactures. Once the cell edges are identified for the different types of client devices, the sensor controller can then make recommendations to the system administrator for adjusting the cell coverage areas as shown by FIG. 3 by, for example, adjusting the transmission power level of the AP 105A or the thresholds for changing the data rate when transmitting signals from the AP 105A to the client devices.

Figure 4:
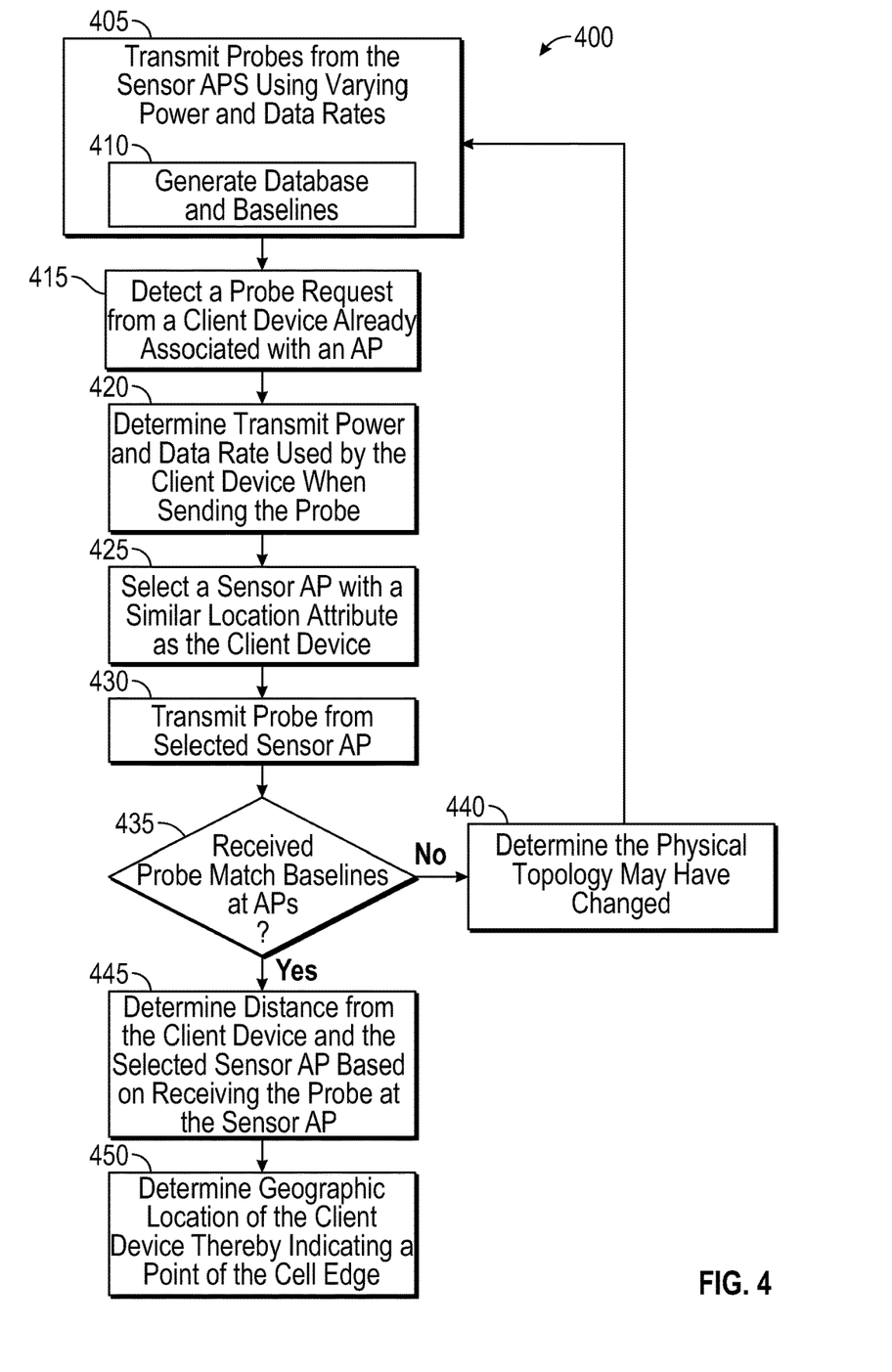
FIG. 4 is a flowchart for detecting a cell edge for a particular client device, according to one embodiment described herein.

FIG. 4 is a flowchart of a method 400 for detecting a cell edge for a particular client device, according to one embodiment described herein. For clarity, the blocks of method 400 are discussed using the site 100 illustrated in FIG. 1, but the method 400 can be used in any AP deployment with any number of APs 105 and sensor APs 120.

At block 405, the sensor APs 120 transmit probe requests to the APs 105 using varying power and data rates. By instructing the sensor APs 120 to send probe requests at different power levels and data rates, the sensor controller can anticipate how changing the transmit power levels and the data rates for a client device 125 or the APs 105 can affect the cell edge. The probe requests transmitted by one of the sensor APs 120 may be received at multiple APs 105. For example, the probe requests transmitted by the sensor AP 120A may be received at both APs 105A and 105B, while the probe requests transmitted by the sensor AP 120B may be received by the APs 105A, 105B, and 105C.

Moreover, as part of transmitting the probe requests, at block 410 the sensor controller 115 generates a database that stores the signal characteristics of the probes received at the APs 105. In addition, the sensor controller 115 can generate baselines (e.g., average RSSI or SNR) from the characteristics of the received probes as discussed above.

At block 415, the WLAN controller 110 detects a probe request from a client device already associated with an AP 105. The client device may send the probe request when reaching a cell edge. As mentioned above, the location of the cell edge may depend on the criteria used by the client device to determine when to roam. The WLAN controller 110 can identify the type of the client device and then use a lookup table or other repository to identify the criteria the client device uses to determine when to roam—e.g., when the RSSI attenuates by −65 dBm or the SNR attenuates by −22 dBm. Because the controller 110 knows the criteria used by the client device to trigger roaming (and transmit the probe request), the controller 110 can determine the RF distance between the associated AP 105 and the client device 125. For example, the controller 110 determines the RF distance is −65 dBM attenuation of the RSSI, but this does not indicate a geographic or physical location of the client device 125. This issue is illustrated in FIG. 5.

Figure 5:
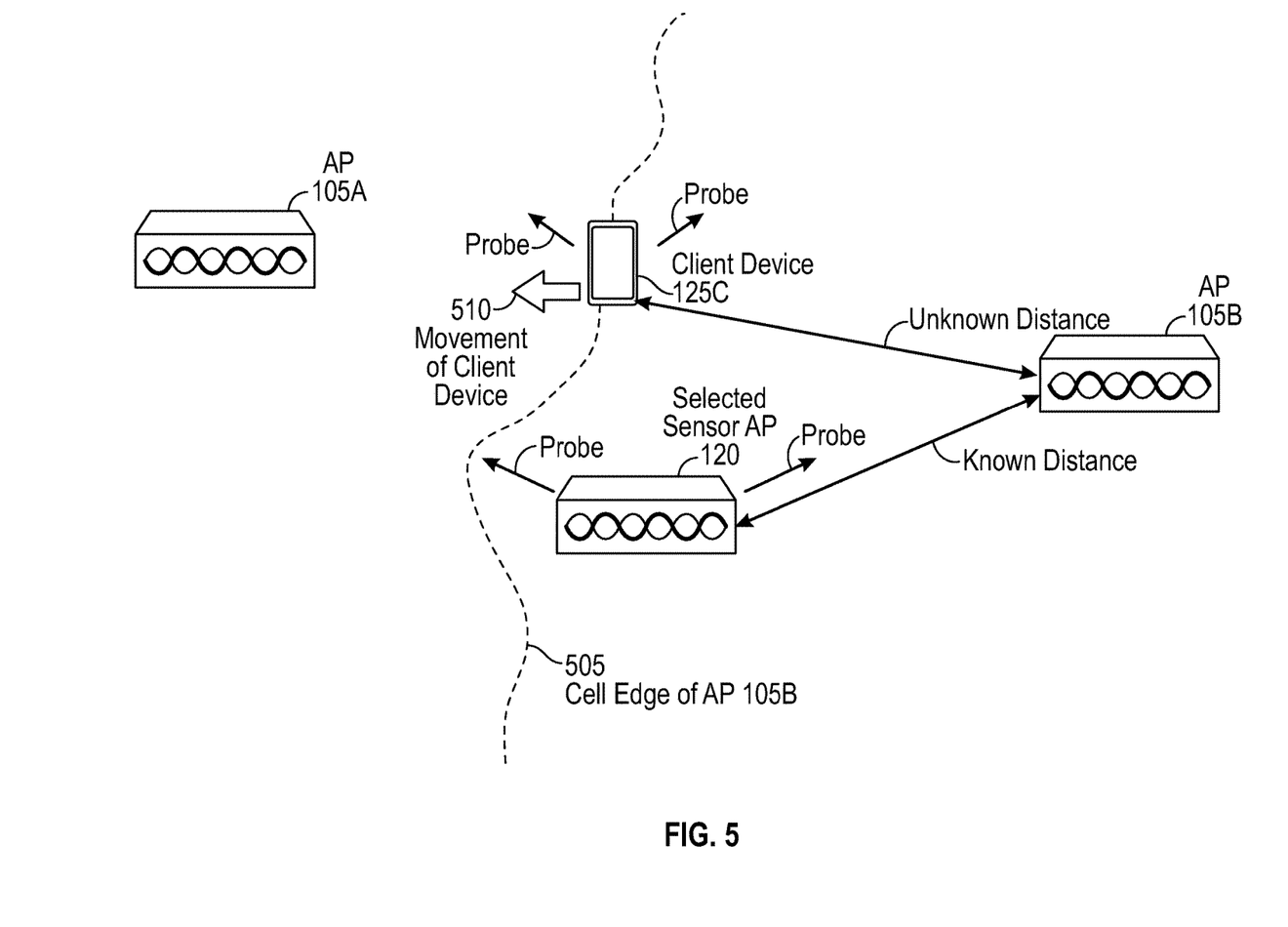
FIG. 5 illustrates identifying a geographic location of a client device to identify a cell edge, according to one embodiment described herein.

FIG. 5 illustrates identifying a geographic location of the client device 125C to identify the cell edge 505B, according to one embodiment described herein. FIG. 5 assumes the client device 125C is currently associated to the AP 105B but is moving in a direction towards the AP 105A as indicated by the arrow 510. Once the roaming criteria in the client device 125C is satisfied (which occurs when the client device 125C reaches the cell edge 505 of the AP 105B), the client device 125C transmits the probe request.

By virtue of the client device 125C transmitting the probe request, the sensor controller can determine the RF distance (i.e., the roaming criteria used by the client device 125C). However, as illustrated by the curves of the cell edge 505, the distance from the cell edge 505 to the AP 105B is not constant. Put differently, the physical topology in most AP deployments causes the cell edges 505 to vary such that the cell edges 505 do not form perfect circles around the APs 105. Thus, for most physical deployments, the RF distance does not directly correspond to a single physical distance between the client device 125C and the AP 105B. Instead, this distance is unknown and depends on where the client device 125C crosses the cell edge 505.

Returning to the method 400, at block 420, the sensor controller 110 determines the transmit power and data rate used by the client device when sending the probe. Some client devices report their transmit power level and data rates when associating to an AP 105. Moreover, when sending a probe request, many client devices send the request using maximum transmit power and maximum data rate. In this manner, the sensor controller 115 can determine the power and data rate used by the client device when transmitting a probe request. In addition, the sensor controller 115 identifies the channel or channels used by the client device when sending the probe request.

At block 425, the sensor controller 115 selects a sensor AP 120 with a similar location attribute as the client device that transmitted the probe response at block 415. The sensor controller 115 can use the same criteria as described in block 220 in method 200 such as selecting the closest sensor AP 120, or the sensor AP with a straight line path which is in the most similar direction as the straight line path from the client device 125 to the same AP 105. In this manner, the signals transmitted by the select sensor AP 120 may best represent the signals transmitted by the client device 125 sending the probe request.

In one embodiment, in addition to one or more of the APs 105 receiving the probe request, the selected sensor AP 120 also receives the probe request. As described below, the sensor controller 115 can use the signal characteristics of the probe request as received by the selected sensor AP 120 to identify a geographic location of the client device 125.

At block 430, the sensor controller 115 instructs the selected sensor AP 120 to transmit a probe request. In one embodiment, the selected sensor AP 120 transmits the probe request using the same channel, transmission power, and data rate as the client device 125 which were determined at block 420. If the client device 125 transmits probe requests on multiple channels, the selected sensor AP 120 may also transmit probe requests on those same channels.

At block 435, the sensor controller 115 determines whether the signal characteristics of the received probe at one or more of the APs 105 matches the baselines generated at block 405 (which may have been generated in a controlled environment using the same power level and data rate). If not, the method 400 proceeds to block 440 where the sensor controller 115 determines the physical topology at the site may have changed. Put differently, comparing the signal characteristics of the received probe (which was transmitted using the same power and data rate as the probe sent by the client device) to the baselines indicates whether the RF environment has changed. If so, this may mean that proceeding with method 400 can lead to inaccurate results regarding the location of the cell edge. Instead, the method 400 can return to block 405 to recalculate the database and the baselines. In this manner, comparing the probe received at the APs 105 to the baselines ensures the sensor probe sent by the client device is in an expected range.

If the received probe sent by the selected sensor AP 120 matches the baseline, the method 400 proceeds to block 445 where the sensor controller 115 determines the distance from the client device and the selected sensor AP 120 based on receiving the probe. Put differently, the selected sensor AP 120 also receives the probe request transmitted by the client device at block 415. The sensor AP 120 can serve as an additional reference to identify the geographic location of the client device. Using the sensor APs 120 (whose distances to the APs 105 are known) may improve accuracy when compared to using, for example, RSSI trilateration to locate the client device using only the APs 105. The sensor AP 120 acts as a signal reference that can limit the effect of micro signal changes at the client device 125. Similarly, using the sensor AP 120 as a type of distance candle can alleviate the effect of recent changes in the physical topology of the cell that would affect the perception of the RF distance of the probing client device 125.

At block 450, the sensor controller 115 determines the geographic location of the client device thereby indicating a point of the cell edge. In one embodiment, the sensor controller 115 uses the distance from the client device 125 to the selected sensor AP 120 as well as distance information gathered by transmitting the test probes from the sensor AP 120 to the APs 105 at block 405 (e.g., when generating the database) and distance information gathered by the probe transmitted by the client device 125 reaching one or more of the APs 105. For example, the sensor controller 115 may perform a RSSI trilateration which may be more accurate because of the addition of the sensor AP 120.

Although the method 400 uses the selected sensor AP 120 to help identify the geographic location of the client device 125, this is not a requirement. For example, in another embodiment, the sensor controller 115 can rely on other location techniques such as determining the angles of attack (AoA) for signals transmitted from the probing client device 125 to the APs 105 which do not need information from the sensor APs 120 to determine the location of the client device 125. Even if the sensor APs 120 are not used to identify the location of the client device, the sensor AP 120 can nonetheless be used at blocks 430-440 to ensure that there was not a change in the RF environment.

Once the geographic location of the client device 125 is identified, the sensor controller 115 can add this location as a point of the cell edge. By repeating the method 400 for the same type of client devices 125 as the client devices 125 roam away from the associated AP 105, the sensor controller 115 can identify a cell edge for those client devices at the current power level of the AP 105. Of course, the sensor controller 115 may also perform method 400 for multiple different types of client devices 125 in parallel. In this manner, the sensor controller 115 can identify the different cell edges for the various types of client devices for all the APs 105 in the deployment.

Figure 6:
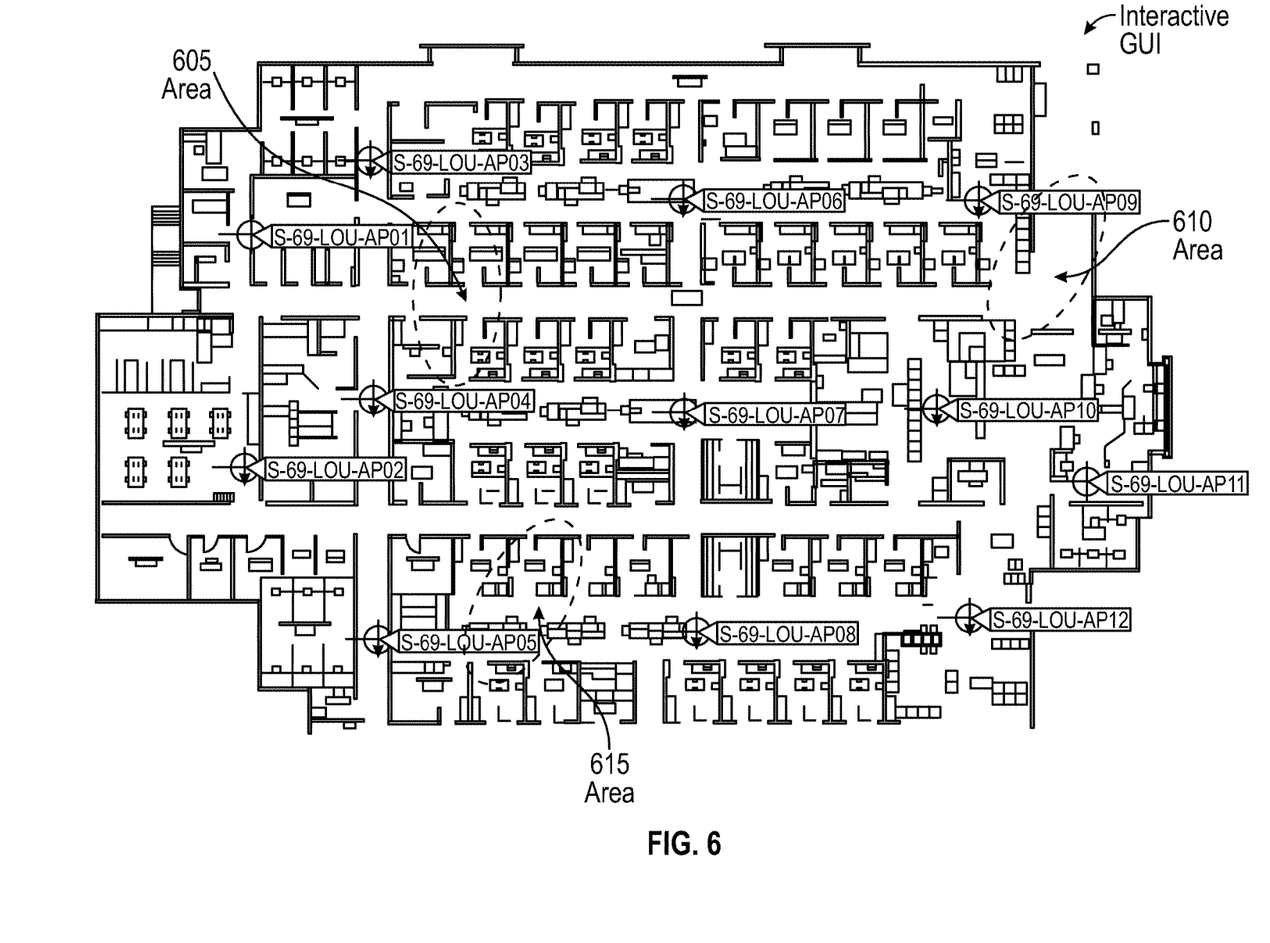
FIG. 6 is an interactive graphical user interface for changing cell coverage areas, according to one embodiment described herein.

FIG. 6 is an interactive graphical user interface (GUI) 600 for changing cell coverage areas, according to one embodiment described herein. The GUI 600 provides a top view or map of a site that includes multiple APs. By performing the methods 200 and 400 described above, the GUI 600 can mark trouble areas indicated as areas 605, 610, and 615. For example, the sensor controller may identify areas where there has been a change in physical topology, an area where there is too much overlap between two neighboring cells, or an area where there is a coverage hole.

In one embodiment, areas 605, 610, and 615 may be interactive in that when the GUI 600 is displayed on a monitor or touch sensitive device, the system administrator can touch or click on the areas 605, 610, and 615. In response, the GUI 600 outputs a description of the problem and suggested actions the system administrator can take or actions that the WLAN controller has already taken to address the issue. For example, when the user interacts with the area 605, the GUI 600 displays "All the laptops are performing fine in this area, but mobile phones running Operation System X.X report low signal." When interacting with the area 610, the GUI 600 displays the text "Client devices in this area only see two APs above −70 dBm, an obstacle appeared that hides AP10. You may want to check onsite if the permanent, and if so, adjust AP 10." When interacting with the area 615, the GUI 600 displays "AP05 power was reduced here to avoid overlap with AP02. However, Type A mobile phones will scan here between AP02 and AP05. Click below if you prefer more cell overlap (higher noise floor) but less scanning." Although not shown in FIG. 6, the GUI 600 can include other interactive buttons that the system administrator can use to instruct the WLAN controller to take an action that may resolve the issues identified in the areas 605, 610, and 615.

In general, the GUI 600 provides a map of the site and permits the system administrator to easily identify the problems areas discovered using the embodiments described above. Although described as being interactive, in other embodiments, the GUI 600 may not be interactive but simply display information about the problem areas. The system administrator can then use other tools to address the problems indicated in the GUI 600.

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

As will be appreciated by one skilled in the art, the embodiments disclosed herein may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium is any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality and operation of possible implementations of systems, methods and computer program products according to various embodiments. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In view of the foregoing, the scope of the present disclosure is determined by the claims that follow.

We claim:

1. A system, comprising:
a plurality of access points (APs) disposed at a site, the plurality of APs configured to associate to client devices;
a sensor AP configured to transmit first test signals to the plurality of APs; and
a controller configured to:
determine, at a first time period, baselines for the sensor AP at a first AP of the plurality of APs and at a second AP of the plurality of APs that received the first test signals,
instruct the sensor AP to transmit second test signals to the plurality of APs at a second time period after the first time period, wherein the second test signals are received at the first and second APs, and upon determining that a characteristic of the second test signals is substantially the same as the baseline corresponding to the first AP but is substantially different from the baseline corresponding to the second AP, determine a change in physical topology that affects a radio frequency (RF) environment at the site.

2. The system of claim 1, wherein the client devices are unable to associate to the sensor AP.

3. The system of claim 1, wherein the controller is configured to:

upon determining a characteristic of the second test signals is substantially different from the baselines of all the of the plurality of APs that received the second test signals, determine that the sensor AP has been moved to a different physical location since the first test signals were transmitted during first time period.

4. The system of claim 1, further comprising:

a plurality of sensor APs disposed at the site, the plurality of sensor APs including the sensor AP, wherein the controller is configured to:

detect that a first client device of the client devices performed an unexpected action based on a current distance of the first client device to one of the plurality of APs to which the first client device is associated; and select the sensor AP from the plurality of sensor APs based on a similar location attribute between the sensor AP and the first client device.

5. The system of claim 4, wherein the unexpected action comprises transmitting a probe request as part of a roaming process too earlier or reducing a data rate used when transmitting signals from the first client device to the one of the plurality of APs.

6. The system of claim 1, further comprising:

a plurality of sensor APs disposed at the site, the plurality of sensor APs including the sensor AP, wherein the controller is configured to:

detect that a first client device of the client devices transmitted a probe request, wherein the first client device is currently associated to one of the plurality of APs, select the sensor AP from the plurality of sensor APs based on a similar location attribute between the sensor AP and the first client device, determine a transmit power and data rate used by the first client device when transmitting the probe request, and instruct the selected sensor AP to transmit a probe request using the transmit power and data rate used by the first client device.

7. The system of claim 6, wherein the controller is configured to:

compare the probe request transmitted by the selected sensor AP to one of the baselines to determine whether the physical topology of the site has changed.

8. The system of claim 7, wherein the controller is configured to:

upon determining the physical topology is unchanged, determine a geographic location of the first client device based on the probe request transmitted by the first client device; and correlate the geographic location of the first client device to a point of a cell edge for the one of the plurality of APs.

9. The system of claim 8, wherein determining the geographic location of the first client device comprises:

determining a distance from the first client device to the selected sensor AP, wherein the selected sensor AP receives the probe request transmitted by the first client device.

10. A method comprising:

instructing a sensor AP to transmit first test signals to a plurality of APs deployed at a site;

determining, at a first time period, baselines for the sensor AP at a first AP of the plurality of APs and at a second AP of the plurality of APs that received the first test signals;

instructing the sensor AP to transmit second test signals to the plurality of APs at a second time period after the first time period, wherein the second test signals are received at the first and second APs; and upon determining that a characteristic of the second test signals is substantially the same as the baseline corresponding to the first AP but is substantially different from the baseline corresponding to the second AP, detecting a change in physical topology that affects an RF environment at the site.

11. The method of claim 10, wherein client devices are unable to associate to the sensor AP.

12. The method of claim 10, further comprising:

detecting that a first client device performed an unexpected action based on a current distance of the first client device to one of the plurality of APs to which the first client device is associated; and selecting the sensor AP from a plurality of sensor APs based on a similar location attribute between the sensor AP and the first client device.

13. The method of claim 10, further comprising:

detecting that a first client device transmitted a probe request, wherein the first client device is currently associated to one of the plurality of APs;

selecting the sensor AP from a plurality of sensor APs based on a similar location attribute between the sensor AP and the first client device;

determining a transmit power and data rate used by the first client device when transmitting the probe request;

instructing the selected sensor AP to transmit a probe request using the transmit power and data rate used by the first client device; and comparing the probe request transmitted by the selected sensor AP to one of the baselines to determine whether the physical topology of the site has changed.

14. The method of claim 13, further comprising:

upon determining the physical topology is unchanged, determining a geographic location of the first client device based on the probe request transmitted by the first client device; and correlating the geographic location of the first client device to a point of a cell edge for the one of the plurality of APs.

15. A non-transitory computer-readable medium for monitoring an RF environment at a site, the non-transitory computer-readable medium having program instructions embodied therewith, the program instructions executable by a processor to perform an operation comprising:

instructing a sensor AP to transmit first test signals to a plurality of APs deployed at the site;

determining, at a first time period, baselines for the sensor AP at a first AP of the plurality of APs and at a second AP of the plurality of APs that received the first test signals;

instructing the sensor AP to transmit second test signals to the plurality of APs at a second time period after the first time period, wherein the second test signals are received at the first and second APs; and upon determining that a characteristic of the second test signals is substantially the same as the baseline corresponding to the first AP but is substantially different from the baseline corresponding to the second AP, detecting a change in physical topology that affects an RF environment at the site.

16. The non-transitory computer-readable medium of claim 15, wherein client devices are unable to associate to the sensor AP.

17. The non-transitory computer-readable medium of claim 15, wherein the operation further comprises:

detecting that a first client device performed an unexpected action based on a current distance of the first client device to one of the plurality of APs to which the first client device is associated; and selecting the sensor AP from a plurality of sensor APs based on a similar location attribute between the sensor AP and the first client device.

18. The non-transitory computer-readable medium of claim 15, wherein the operation further comprises:

detecting that a first client device transmitted a probe request, wherein the first client device is currently associated to one of the plurality of APs;

selecting the sensor AP from a plurality of sensor APs deployed at the site based on a similar location attribute between the sensor AP and the first client device;

determining a transmit power and data rate used by the first client device when transmitting the probe request;

instructing the selected sensor AP to transmit a probe request using the transmit power and data rate used by the first client device; and comparing the probe request transmitted by the selected sensor AP to one of the baselines to determine whether the physical topology of the site has changed.

19. The non-transitory computer-readable medium of claim 18, wherein the operation further comprises:

upon determining the physical topology is unchanged, determining a geographic location of the first client device based on the probe request transmitted by the first client device; and correlating the geographic location of the first client device to a point of a cell edge for the one of the plurality of APs.

20. The non-transitory computer-readable medium of claim 15, wherein the operation further comprises:

upon determining a characteristic of the second test signals is substantially different from the baselines of all the of the plurality of APs that received the second test signals, determine that the sensor AP has been moved to a different physical location since the first test signals were transmitted during first time period.

* * * * *

UNITED STATES PATENT AND TRADEMARK OFFICE
CERTIFICATE OF CORRECTION

PATENT NO. : 10,462,015 B1
APPLICATION NO. : 16/052493
DATED : October 29, 2019
INVENTOR(S) : Jerome Henry et al.

Page 1 of 1

It is certified that error appears in the above-identified patent and that said Letters Patent is hereby corrected as shown below:

In the Specification

In Column 3, Lines 65-66, delete "of the of the" and insert -- of the --, therefor.

In the Claims

In Column 15, Line 16, in Claim 3, after "all" delete "the".

In Column 18, Line 24, in Claim 20, after "all" delete "the".

Signed and Sealed this
Thirty-first Day of December, 2019

Andrei Iancu
*Director of the United States Patent and Trademark Office*